United States Patent
Mackiewicz

(12) 
(10) Patent No.: US 7,721,854 B1
(45) Date of Patent: May 25, 2010

(54) ASSURED RUNNING CLEARANCE CALIPER

(75) Inventor: John Mackiewicz, Niles, MI (US)

(73) Assignee: Robert Bosch GmbH, Stuttgart (DE)

( * ) Notice: Subject to any disclaimer, the term of this patent is extended or adjusted under 35 U.S.C. 154(b) by 292 days.

(21) Appl. No.: 11/693,855

(22) Filed: Mar. 30, 2007

(51) Int. Cl.
*F16D 65/14* (2006.01)

(52) U.S. Cl. .................................. 188/73.44; 188/71.8

(58) Field of Classification Search ............... 188/73.44, 188/71.8
See application file for complete search history.

(56) References Cited

U.S. PATENT DOCUMENTS

| | | | | |
|---|---|---|---|---|
| 4,051,927 | A | * | 10/1977 | Karasudani ............... 188/73.44 |
| 4,331,221 | A | * | 5/1982 | Evans et al. ............... 188/73.44 |
| 4,458,790 | A | * | 7/1984 | Hoffman et al. ........... 188/71.8 |
| 4,709,789 | A | * | 12/1987 | Czich et al. ............... 188/73.44 |
| 4,715,479 | A | * | 12/1987 | Buckley .................... 188/71.8 |
| 5,934,416 | A | | 8/1999 | Maeda |
| 6,397,983 | B1 | | 6/2002 | Roszman |

* cited by examiner

*Primary Examiner*—Melanie Torres
(74) *Attorney, Agent, or Firm*—Maginot, Moore & Beck

(57) ABSTRACT

A brake mechanism fixed to a member allowing limited reciprocal motion and providing a restorative force to the movable member in one direction of movement thereof. A brake mechanism includes a rotor fixed to and wheel about an axle axis has a caliper assembly spanning the rotor with inboard and outboard friction members supported on either side of the rotor for selectively engaging the rotor and braking the wheel. A piston is fixed to the caliper of the inboard friction member for moving the inboard friction member toward the rotor and including a piston seal which, upon removal of fluidic pressure from the cylinder, resiliently urges the inboard friction member away from the rotor. A bracket is fixed to the vehicle supports the caliper on a pair of generally cylindrical guide pins fixed to one of the anchor bracket and caliper assembly and is movable within a pair of generally cylindrical guide pin bores of the anchor bracket and caliper assembly. A pair of central cylindrical shells and an end engaging a pin shoulder to provide the restorative force and a radially outer portion of reduced rigidity such as a plurality of fins frictionally engaging the aperture.

20 Claims, 4 Drawing Sheets

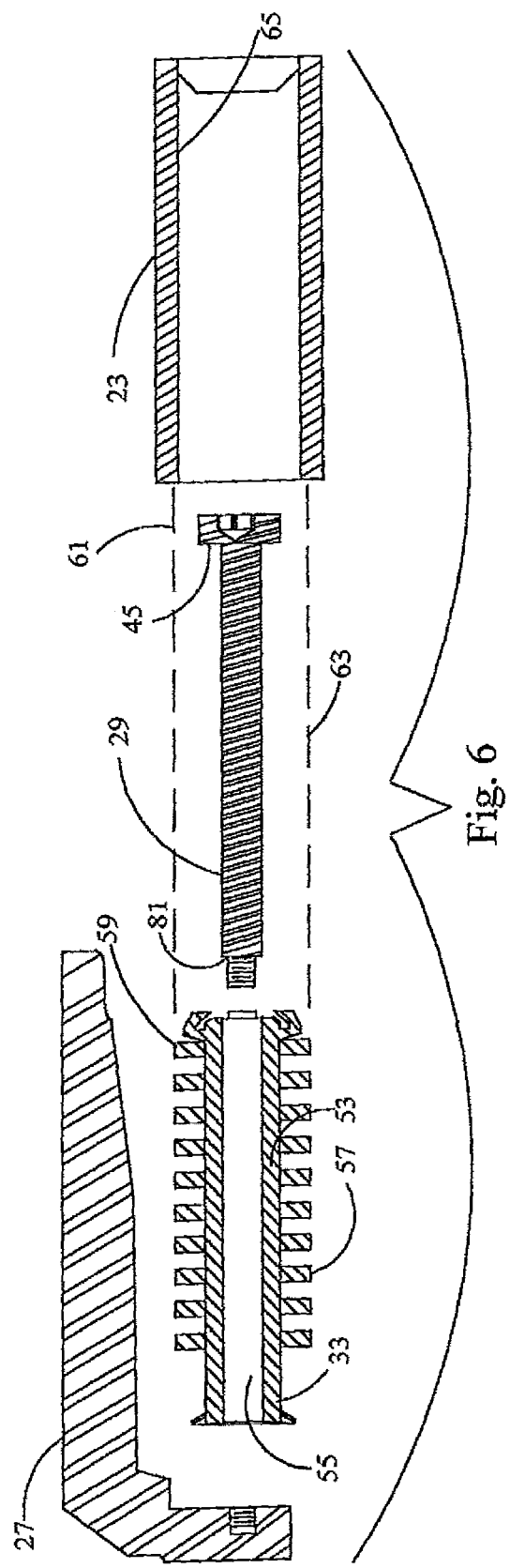
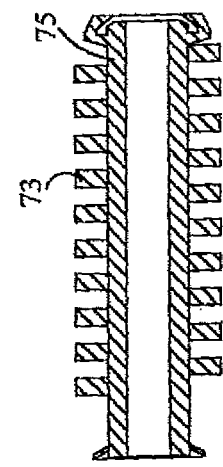
Fig. 11
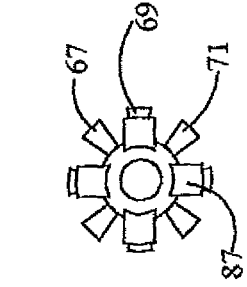
Fig. 10
Fig. 6
Fig. 7

ASSURED RUNNING CLEARANCE CALIPER

The present invention relates to vehicle braking systems of the disc variety, and more particularly to a disc brake caliper which restores proper running clearance after a braking event for both inboard and outboard brake pads and automatically compensates for pad wear.

BACKGROUND OF THE INVENTION

The problem of maintaining a proper running clearance between braking members is an old one. For many years, drum style brake shoes were manually advanced to compensate for wear of the shoe friction surface, for example, by turning a star wheel adjustment nut. This periodic maintenance routine was frequently initiated upon the vehicle driver detecting excess brake pedal travel. Later, automatic adjusters for resetting the rest or released shoe location were developed, some requiring the vehicle to be braked while moving in reverse to reposition the shoes. With the advent of disc brakes, some systems have employed a radially deformable metal tube with a shoulder which provides a rest or retracted position for the brake pads. Excess pad travel induces radial deformation of the tube axially repositioning the shoulder along the tube and establishing a new pad retracted location. Other systems have relied on the natural resilience of piston seals to retract the brake pads and provide running clearance between the brake rotor and brake pads. In the case of floating caliper style disc bakes, the piston seal resilience adequately retracts the inboard brake pad away from the rotor after a braking event, but repositioning of the outboard pad has been somewhat unreliable. Recent attempts to achieve more uniform clearance for both inboard and outboard pads have concentrated on the interplay between the caliper guide pins and the member in which they slide.

For example, one embodiment in U.S. Pat. No. 5,934,416 employs a plurality of elastic annular rings recessed either in the guide pin surface or the sidewall of the hole in which the guide pin reciprocates. The annular rings engage the other member and deform without slipping during braking. Excess brake pad travel induces slippage between the members after the deformation resulting in repositioning the pin within its hole. In another embodiment, a series of axially spaced apart radially extending springs are located along the pin surface or hole sidewall and the other member has a single similar radially extending spring. During normal braking, the single spring transition between a specific pair of the other member springs, but excess pad travel causes the single spring to slip past one of the two adjacent springs and thereafter to transition between a new specific pair. Variations on these techniques are employed in other embodiments.

U.S. Pat. No. 6,397,983 reiterates stating a common problem in the art of brakes is that stationary brake pads often drag on a movable friction element after the braking pressure has been released. This causes excessive wear on the pads and reduces the overall performance of the vehicle. In the art of automotive and truck disc brakes, this problem is presented when the brake pad that is carried by a movable, or floating, caliper drags on the rotor after braking pressure is released. This occurs mostly because the frictional forces between the elements carrying the caliper, such as the friction between the slide pins and the walls of the bore in which they ride, prevent return of the caliper to a rest position providing a gap between the pad and the rotor after release of braking pressure. This patent suggests a mechanism for providing a clearance between a brake pad and a rotor in a sliding-pin, floating-caliper disc brake which includes a bushing that receives a sliding pin and a resilient element between the end of the pin and the end of the bushing. The bushing is a cylindrical shell with smooth inner and outer diameters for receiving the pin and engaging a bore respectively and has a reduced diameter hole in an otherwise closed end through which a reduced diameter free end portion of the pin passes. A retainer engages the free end and holds a wave washer captive between the bushing end and the free pin end. The pin reciprocates in the bushing during operation of the brakes, and the bushing moves along the bore as the brake pads wear. A large number of parts coupled with complex assembly are just one problem with this solution, thus after over one-half century, these problems remain partially unsolved and continue to plague the industry.

It is desirable to maintain proper running clearance for both inboard and outboard brake pads in a very simplistic and economical manner.

SUMMARY OF THE INVENTION

The present invention provides solutions to the above problems by centering the caliper over the rotor subsequent to each brake release and establishing a predetermined bilateral running clearance. The inboard and outboard running clearances may be predisposed to be the same or of different amounts. These prescribed running clearances will be maintained regardless of inner and/or outer brake shoe pad wear or lining thickness variations. Of equal importance is the maintenance of this prescribed running clearance, prior to, during, and subsequent to lateral accelerations of the caliper imposed by the vehicle during off-brake driving durations. This may greatly reduce disk thickness variation generation and resulting brake torque variation. This maintenance is uniquely accomplished by a set of caged preloaded resilient members that are directly referenced to the rotor(s inboard and outboard rubbing surfaces. This referencing and the resulting positioning provide and maintain bilateral running clearance that is usually only obtainable in a fixed head caliper design. Thus, this design provides this benefit of a fixed head caliper without the cost and associated negative performance factors associated with the fixed head design.

This rotor reference positioning and maintenance of bilateral running clearance is ensured to a much more substantial degree than any other known design due to the embodiment of the caged preloaded resilient members. Specifically, this caged preloaded design provides a much higher restorative force to the caliper and brake shoe pads to initialize and maintain the bilateral running clearance. This caged preload design provides immediate and higher restorative force and it is most dependent upon the resilient member preload versus its spring rate which can be more closely established at the time of assembly. This instantaneous restorative force to keep a caliper in its desired centered position is accomplished without the caliper having to deviate significantly to either side of its centered position to generate the restorative force. This design element helps preclude brake shoe pads from striking the rotor, as the restorative force intervenes before the caliper and brake shoe pads travel far enough to strike the rotor.

The invention comprises, in one form thereof, a brake mechanism for a vehicle wheel, which has a rotor fixed to and rotatable therewith about an axle axis. A caliper spans the rotor and supports inboard and outboard friction members or pads, one to either side of the rotor for selectively engaging the rotor and braking the wheel. One or more fluidic cylinders are fixed to the caliper having pistons fixed to the inboard friction member for moving the inboard friction member toward the rotor upon receipt of fluidic pressure. Each cylinder has a piston seal which, upon removal of fluidic pressure from the cylinder, resiliently urges the inboard friction member away from the rotor. An anchor bracket is fixed to the vehicle for slidingly supporting the caliper. At least one generally cylindrical guide pin is fixed to one of the anchor bracket and caliper assembly. As disclosed, the guide pin threadedly engages the caliper. At least one generally cylindrical guide pin bore is located within the other of the anchor bracket and caliper assembly for receiving a corresponding guide pin. A generally cylindrical resilient bushing is interposed between the guide pin and bore for slidingly receiving the guide pin and frictionally engaging the bore. The unstressed bushing outside diameter exceeds the bore inside diameter so that the bushing is under radial compression when fit within the bore whereby the bushing is diameterally preloaded to frictionally maintain the axial location of the bushing within the bore. The pin has a shoulder for holding the bushing captive between the shoulder and said one of the anchor bracket and caliper assembly and the bushing includes a resilient end portion which is axially compressed by the guide pin shoulder as the piston receives fluidic pressure for engaging the shoulder to urge the outboard pad away from the rotor upon release of fluid pressure. The bushing has a solid cylindrical shell portion with a central cylindrical aperture for receiving the guide pin and a set of resilient deformable radially outwardly extending members for engaging the bore. The bushing may also compensate for dimensional variations, such as the guide pin bore cylindrical axis being radially displaced from the guide pin cylindrical axis.

An advantage of the present invention is that fewer parts are required to achieve proper running clearance. As a result, the system is less expensive to manufacture than prior systems.

Another advantage is the composition and arrangement of components centers and secures the caliper over the rotor upon each brake release, thus inherently providing equal running clearance on each side of the rotor to the pads, while compensating for pad wear.

A further advantage is if the centerline of the bore of the sleeve is offset from the centerline of the outside diameter of the sleeve, accommodation of the variance of distance between the pins, due to manufacturing tolerances, may be readily accommodated without bending or preloading the pins.

BRIEF DESCRIPTION OF THE DRAWINGS

FIG. 6 is an exploded cross-sectional view of the components of FIGS. 2-5;

FIG. 7 is a bushing end view from the right end of FIG. 6;

FIG. 10 is a bushing end view from the right end of FIG. 6 illustrating one variation on the bore engaging ribs; and FIG. 11 is a cross-sectional view of another variation on the bore engaging ribs on the bushing of FIG. 6.

Corresponding reference characters indicate corresponding parts throughout the several drawing views.

DETAILED DESCRIPTION OF THE INVENTION

Figure 1:
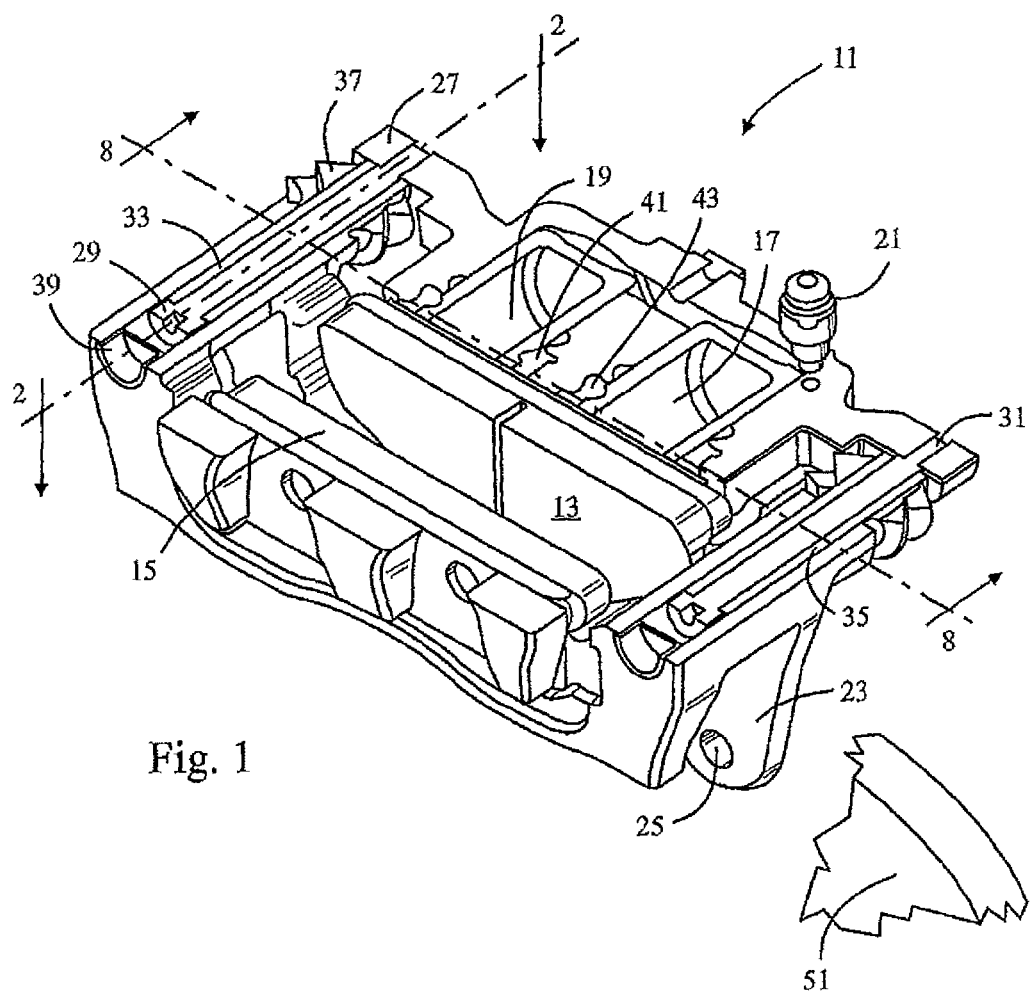
FIG. 1 is a cross-section isometric view of a brake caliper assembly incorporating the invention in one form.

Referring now to the drawings and particularly to FIG. 1, there is shown, in cross-section, a brake caliper assembly 11 for spanning and selectively braking a conventional wheel supported rotor 51 and attached vehicle wheel. The caliper includes an inboard friction surface or pad 13 and an outboard pad 15 to be positioned on opposite sides of a portion of the rotor and moved into braking engagement with the rotor by an operator actuated supply of hydraulic fluid to a pair of hydraulic cylinders 17 and 19 via inlet 21. The caliper assembly includes an anchor bracket 23 which is fixed to the vehicle, for example, by bolts passing through apertures such as 25. A caliper portion 27 is mounted for limited travel relative to the anchor bracket 23 along guide pins 29 and 31. The guide pins may be shoulder bolts which engage the caliper pin ear, bringing the shoulder 81 (FIGS. 3a and 6) of the bolt in direct and permanent contact with caliper pin ear face. An annular bushing portion (FIG. 3a) may be included to exclude dirt from the area of the bushing face 81. The guide pins are illustrated threaded into the caliper as better seen in FIGS. 2-8, but may be fixed to either the anchor bracket or the caliper and slidable in apertures in the other. The guide pins 29 and 31 are free to slide in respective bushings 33 and 35 in bores in the anchor bracket 23. These anchor bracket bores are sealed against dirt and moisture by flexible boots such as 37 at one end and by plugs such as 39 at the other end. When a vehicle operator commands, fluid is supplied to the cylinders 17 and 19 whose pistons urge the inboard pad 13 toward the left and downwardly as viewed in FIG. 1 and into engagement with the inboard face of the rotor. A continued supply of fluid causes the caliper to translate right and upwardly along the bushings 33 and 35 drawing the outboard pad 15 into engagement with the outboard rotor face braking the vehicle wheel. Conventionally, inboard pad 13 is fixed to the cylinder pistons and when fluid pressure is released, the natural resilience of the piston seals 41 and 43 withdraws the piston attached inboard pad from the rotor face, but the outboard pad is not so fortunate. Restoration of running clearance for the outboard pad upon brake release is accomplished in the present invention by the interaction of the bushings 33 and 35 with the other components as illustrated in FIGS. 2 and 3.

Figure 2:
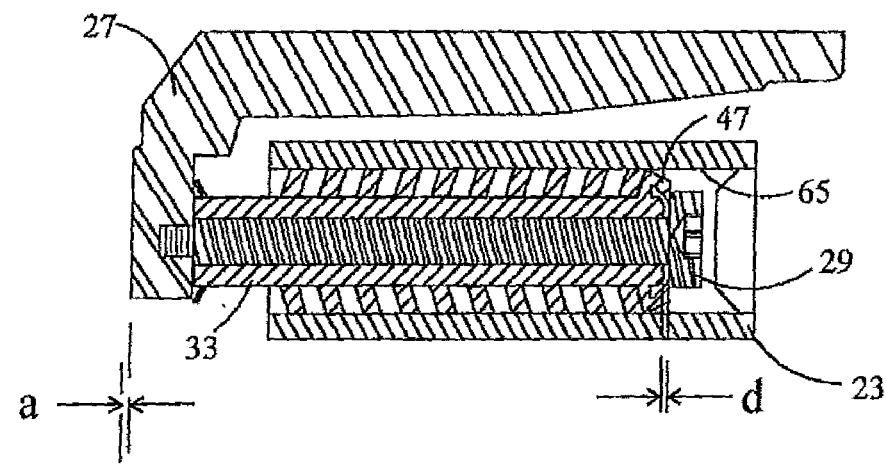
FIG. 2 is a cross-section along line 2-2 showing a portion of FIG. 1 in a brake unapplied condition.

In the brake released or unapplied condition as seem in FIG. 2, the left end of bushing 33 engages the caliper 27. There is a gap (d (between the right bushing end 49 and the shoulder 45 of the guide pin 29, however, a peripheral bushing portion 47 may engage the pin shoulder 45, compare FIGS. 2 and 2a. When the brake is applied and the inboard pad 13 engages the rotor, continued piston motion induces caliper movement a distance "a" to engage the outboard brake pad 15 and rotor face, compare FIGS. 2 and 3. Bushing 33 may be formed as a single molded member of resilient material. The pin shoulder 45 which may have already been in contact with bushing portion 47 now compresses portion 47 the distance "d" allowing shoulder 45 to approach the bushing right end face 49 while a gap "c" forms between the bushing left end and the caliper as best seen in FIG. 3a. When the brake is released, the resilience of bushing portion 47 forces pin 33 back toward the right returning the components to their FIG. 2 locations and reestablishing the outboard pad running clearance. Thus far, the bushing 33 has remained fixed within the anchor bracket bore.

Figure 3:
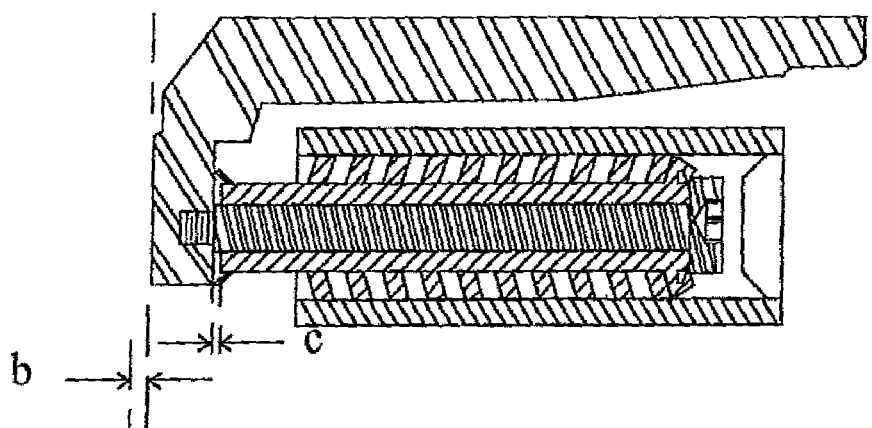
FIG. 3 is a cross-section along line 2-2 showing a portion of FIG. 1 in a brake applied condition.
Figure 4:
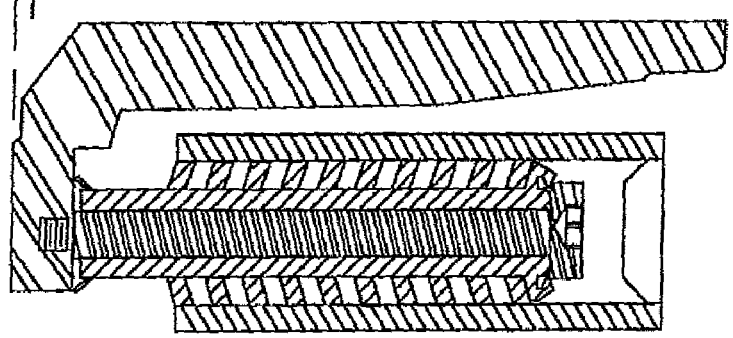
FIG. 4 is a cross-section along line 2-2 showing a portion of FIG. 1 in a brake applied condition illustrating running clearance compensation.
Figure 3A:
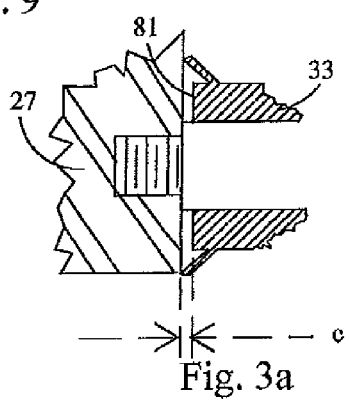
FIG. 3a is an enlarged cross-sectional view of a portion of the bushing and caliper illustrating the gap of FIG. 3.

Brake pad wear will eventually allow the distance (a (to exceed the gap "d." When this occurs, pin shoulder 45 engages bushing 33 face 49 and additional caliper travel "b" slides the bushing leftward as viewed from the location in FIGS. 2 and 3 to the location in FIG. 4. Now when the fluid pressure is relieved, the resilience of bushing portion 47 reestablishes the outboard pad clearance at the new "brake adjusted" location shown in FIG. 5.

In FIG. 6, the components shown in FIGS. 2-5 have been exploded away from one another to more clearly show the individual component features and to illustrate the simple assembly technique. An end view of the bushing or sleeve 33 is shown in FIG. 7. The bushing comprises a solid cylindrical shell portion 53 with a central cylindrical aperture 55 for slidingly receiving the guide pin 29 and a set of resilient deformable outwardly extending members such as 57 and 59 for frictionally engaging the bore 65. As illustrated in FIGS. 6 and 7, the set of outwardly extending members comprise a plurality of radially extending ribs or annuluses which are axially deformed when frictionally engaging the bore, compare FIGS. 6 and 7 where the annuluses extend radially outwardly to FIGS. 2-5 where they are additionally skewed axially. Note the dotted lines 61 and 63 in FIG. 6 showing that the outside diameter of the bushing exceeds the inside diameter of the anchor bracket bore 65. Since the unstressed bushing outside diameter exceeds the bore 65 inside diameter, the bushing is radially compressed to fit within the bore providing a diameteral preload to frictionally maintain the axial location of the bushing within the bore. The bushing to bore frictional engagement may be achieved by any suitable rib or other resilient member deformable configuration. For example, FIG. 10 illustrates the set of outwardly extending members as an axially spaced plurality of sets of radially extending fingers such as 67, 69 and 71 which could be axially deformed when frictionally engaging the bore with the side view appearing much the same as in FIGS. 2-5. The set of outwardly extending members could also comprise one or more helical ribs 73 wrapped about and extending radially outwardly from the solid shell portion 75 of FIG. 11 and such a rib could experiencing axial deformation and/or radial compression when frictionally engaging the bore. While not illustrated, longitudinally extending ribs can also be envisioned. Regardless of the specific configuration, the fins or fingers on the sleeve or bushing provide positive location of the sleeve in the bore and provide a diametrical force preload of the sleeve inside the pin bore. This diametrical preload force is the normal force, which in conjunction with the coefficient of friction between the sleeve and the bore, provides a lateral resistive force to oppose translation of the sleeve along the bore. This resistance to movement is important in the operation of the brake in that it must exceed, by a sufficient margin, the lateral slide force of the pin in the sleeve.

Lateral slide force of the pin in the sleeve.

Figure 2A:
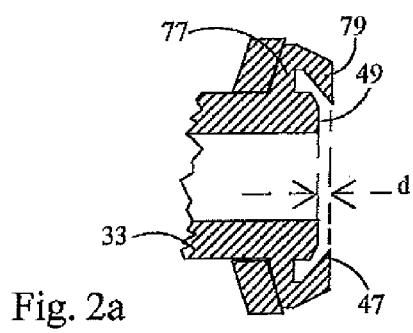
FIG. 2a is an enlarged cross-sectional view of a portion of the bushing illustrating the gap of FIG. 2.

The sleeve 33 portrays a design at its right hand end to provide a caged preloaded resilient mechanism function which imparts a force on the pin bolt 29 which pulls the pin bolt to the right as viewed in FIG. 6. The right end portion of bushing 33 has reduced rigidity due to the axially collapsible region formed by a radially outwardly extending base portion 77 which blends into a radially inwardly extending free end 79 as best seen in FIG. 2a. This reduced rigidity end may be a complete annulus, e.g., a solid of revolution, or formed as a series of radially extending fingers as illustrated at 83, 85 or 87 in FIGS. 7 and 10. This reduced rigidity end, the radially extending fins and the solid cylindrical shell portion are preferably all one piece formed at the same time of the same molded material, for example, by an injection molding technique.

The brake mechanism is assembled a shown in FIG. 6. The bolt 29 is passed into the central hole 55 and threaded into the caliper 27. The bushing 33 may then be introduced into the bore 65 distorting the ribs 57 and 59 both axially and radially, or the introduction of bushing 33 into the bore 65 may precede assembly of the pin to the caliper causing initial distortion of the ribs or fins in the orientation shown in FIGS. 2-5. In either case, when introduced into the anchor bracket bore, the bushing fins 57, 59 experience both shear and compression.

Figure 5:
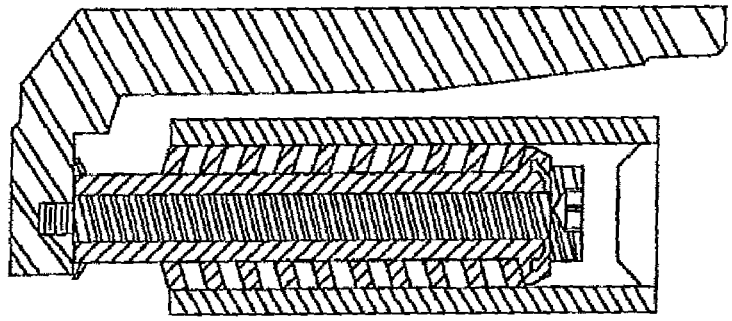
FIG. 5 is a cross-section along line 2-2 showing a portion of FIG. 1 in a brake unapplied condition following running clearance compensation.

In operation, as the brake is transitioning from a brake applied condition as in FIG. 4 to the brake unapplied condition as in FIG. 5, the resilient mechanism at the right bushing end imparts a force on the pin bolt 29 shoulder 45 resulting in its movement to the right, until the caliper ear face comes in contact with the end of the sleeve as in FIGS. 2 and 5 and the subject travel of the pin bolt and caliper is thus limited. The caliper will move in this prescribe manner as long as the lateral restraint force of the sleeve to the anchor bracket sleeve bore 65 is greater than the force required to move the pin and caliper. This prescribed motion of the pin ear and thus the caliper by the same motion of both integral pin ears to the caliper body, result in moving the caliper to the right, as pictured in FIGS. 2-6 (left and downward in FIG. 1). This movement provides a prescribed running clearance of the outer brake shoe pad 15 to the rotor 51, since the outer shoe brake pad is affixed to the outer caliper legs. This prescribed movement is predetermined by the gaps shown in FIGS. 2 and 3, as designed by only the difference of two dimensions: the pin bolt under head to shoulder dimension and the overall length of the sleeve.

As the brake is transitioning from a brake unapplied condition as in FIG. 2 to a brake applied condition as in FIG. 3, the force of the brake pistons by reaction of the inner brake pad 13 against the rotor 51 causes the caliper to translate inboard or to the left in FIGS. 2-5. This in turn causes the pin bolt to move to the left as the resilient end portion 47 is compressed the distance "d". This resets the conditions as described above to allow the operation of the prescribed design elements to effect a centering of the caliper over the rotor and establishment of outer brake shoe pad to rotor running clearance as described above, during a brake release.

If outer pad lining wear occurred during the previous brake applied duration, the subsequent apply of the brake will cause the full compression of the resilient member 47 between the underside 45 of the head of the pin bolt and the right end 49 of the sleeve. Continuing during this same brake apply and subsequent to this full compression, additional travel of the outer brake pad and caliper housing will then cause the sleeve to translate to the left a distance "b" in the anchor bracket pin bore as seen by comparing FIGS. 3 and 4. This will ensure that the released position of the brake housing and outer brake shoe pad will adjust for outer brake shoe pad wear, each and every brake apply, and will thus ensure a consistent running clearance of the outer brake shoe pad to the rotor regardless of outer brake shoe pad wear thickness. The often used standard feature of connecting the inner brake shoe assembly to the piston(s), so that seal resilience and retraction of the piston upon brake release would also retract the inner brake shoe pad and establish its respective running clearance to the rotor.

Figure 8:
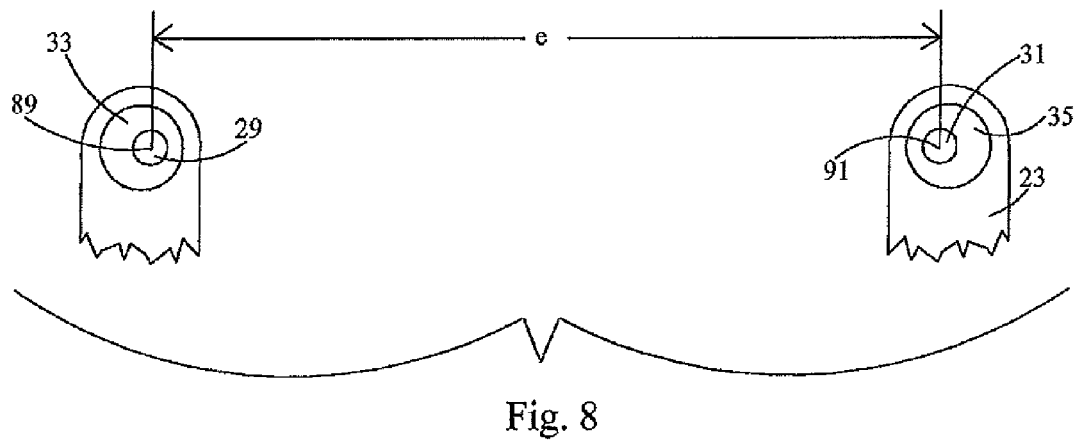
FIG. 8 is a cross-section along line 8-8 showing a portion of FIG. 1.
Figure 9:
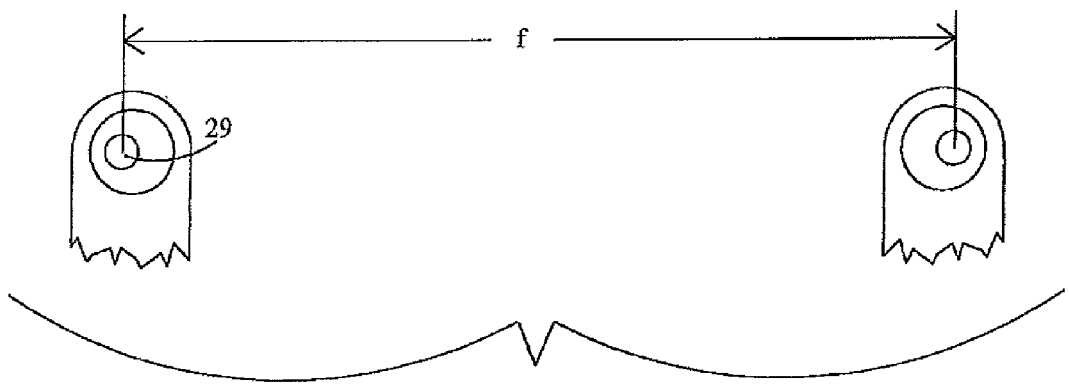
FIG. 9 is also a cross-section along line 8-8 showing a portion of FIG. 1, but illustrating different pin spacing.

In FIG. 8, a pair of generally cylindrical guide pins 29 and 31 are illustrated as fixed to the caliper assembly and having generally parallel cylindrical axes 89 and 91 spaced apart a distance "e". The axes of the anchor bracket 23 apertures or guide pin bores are, however, spaced further apart than "a". The pair of generally cylindrical resilient bushings 33 and 35, which are interposed between the guide pin and corresponding bores may provide compensation for the difference between the distances separating the axes. Similarly, if the guide pin separation is oversize, e.g., distance "f", the bushings are again capable of compensation as seen in FIG. 9. Hence, if the centerline of the bore of the sleeve is offset from the centerline of the outside diameter of the sleeve, accommodation of the variance of distance between the pins, due to manufacturing tolerances, may be readily accommodated without bending or preloading the pins. The placement or rotation of the sleeves in their respective bores, can be made judiciously to compensate for differences in the distance between pins as shown in FIGS. 8 and 9. The sleeve also has the capability due to its physical design shape, and diameter preload to provide the ability to absorb and dissipate vibrational energy. This coupled with the offset centerline approach, provide the capability and advantages of a twin low diameter clearance pin caliper while maintaining low pin slide force.

Thus, while a preferred embodiment has been disclosed, numerous modifications will occur to those of ordinary skill in this art. Accordingly, the scope of the present invention is to be measured by the scope of the claims which follow.

What is claimed is:

1. A brake mechanism for a wheel of a vehicle, comprising:
a rotor fixed to and rotatable with the wheel about an axle axis;
a caliper structure spanning the rotor;
inboard and outboard friction members supported by the caliper structure, one to either side of the rotor, for selectively engaging the rotor and braking the wheel;
a fluidic cylinder supported by the caliper structure and having (i) a piston fixed to the inboard friction member and configured to move the inboard friction member toward the rotor upon receipt of fluidic pressure, and (ii) a piston seal configured to urge the inboard friction member away from the rotor upon removal of fluidic pressure from the cylinder;
an anchor bracket structure fixed to the vehicle;
a guide pin fixed to one of the anchor bracket structure and the caliper structure;
a bore structure having an interior bore surface that defines a guide pin bore, the bore structure being fixed in relation to the other of the anchor bracket structure and the caliper structure, and the guide pin bore being configured to receive the guide pin therein; and
a resilient bushing interposed between the guide pin and the interior bore surface,
wherein the guide pin is movable in relation to the anchor bracket structure between a first relative position and a second relative position,
wherein, when the guide pin is located in the first relative position, the resilient bushing is positioned in contact with the one of the anchor bracket structure and the caliper structure,
wherein, when the guide pin is located in the second relative position, the resilient bushing is spaced apart from the one of the anchor bracket structure and the caliper structure, and
wherein the resilient bushing biases the guide pin toward the first relative position.

2. The brake mechanism of claim 1, wherein:
the guide pin includes (i) a threaded end portion, and (ii) a free end portion including a radially extending shoulder,
one of the anchor bracket structure and the caliper structure defines a threaded recess that is meshingly receives the threaded end portion of the guide pin, and
the resilient bushing is interposed between the radially extending shoulder and said one of the anchor bracket structure and the caliper structure.

3. The brake mechanism of claim 2, wherein the resilient bushing includes a resilient end portion positioned in contact with the radially extending shoulder.

4. The brake mechanism of claim 3, wherein movement of the guide pin from the first relative position to the second relative position causes the resilient end portion of the resilient bushing to be axially compressed against the radially extending shoulder of the free end portion of the guide pin.

5. The brake mechanism of claim 1, wherein:
the guide pin bore defines a first axis,
the guide pin defines a second axis, and
the first axis is offset from the second axis.

6. The brake mechanism of claim 1, wherein the resilient bushing slides on the guide pin during movement of the guide pin between the first relative position and the second relative position.

7. The brake mechanism of claim 1, wherein:
the brake mechanism is configured to be positioned in a brake released state and a brake applied state, and
the guide pin moves from the first relative position to the second relative position in response to the brake mechanism moving from the brake released state to the brake applied state.

8. The brake mechanism of claim 7, wherein moving of the brake mechanism from the brake released state to the brake applied state causes the resilient bushing to slide on the guide pin from the first relative position to the second relative position.

9. The brake mechanism of claim 8, wherein moving of the brake mechanism from the brake applied state to the brake released state causes the resilient bushing to slide on the guide pin from the second relative position to the first relative position.

10. The brake mechanism of claim 1, wherein:
the resilient bushing includes (i) a cylindrical shell that defines a central passage, and (ii) a plurality of resilient members extending radially from the cylindrical shell,
the guide pin is received within the central passage, and
the plurality of cylindrical members are positioned in contact with the interior bore surface.

11. The brake mechanism of claim 10, wherein the guide pin slides on the cylindrical shell when the guide pin moves between the first relative position and the second relative position.

12. The brake mechanism of claim 1, wherein the guide pin slides on the resilient bushing when the guide pin moves between the first relative position and the second relative position.

13. The brake mechanism of claim 1, further comprising (i) a second anchor bracket structure, (ii) a second caliper structure, (iii) a second guide pin fixed to one of the second anchor bracket structure and the second caliper structure, (iv) a second bore structure having a second interior bore surface that defines a second guide pin bore, the second bore structure being fixed in relation to the other of the second anchor bracket structure and the second caliper structure, and the second guide pin bore being configured to receive the second guide pin therein, and a second resilient bushing interposed between the second guide pin and the second interior bore surface,
  wherein the second guide pin is movable in relation to the second anchor bracket structure between a third relative position and a fourth relative position,
  wherein, when the second guide pin is located in the third relative position, the second resilient bushing is positioned in contact with the second caliper structure,
  wherein, when the second guide pin is located in the fourth relative position, the second resilient bushing is spaced apart from the second caliper structure, and
  wherein the second resilient bushing biases the second guide pin toward the third relative position.

14. A brake mechanism for a wheel of a vehicle, comprising:
  a rotor fixed to and rotatable with the wheel;
  a caliper structure spanning the rotor;
  inboard and outboard friction members supported by the caliper structure and configured to selectively engage the rotor;
  a fluidic cylinder supported by the caliper structure and having (i) a piston fixed to the inboard friction member and configured to move the inboard friction member toward the rotor upon receipt of fluidic pressure, and (ii) a piston seal configured to urge the inboard friction member away from the rotor upon removal of fluidic pressure from the cylinder;
  an anchor bracket structure fixed to the vehicle;
  a guide pin fixed to the caliper structure;
  a bore structure having an interior bore surface that defines a guide pin bore, the bore structure being fixed in relation to the anchor bracket structure, and the guide pin bore being configured to receive the guide pin therein; and
  a resilient bushing interposed between the guide pin and the interior bore surface,
  wherein the guide pin is movable in relation to the anchor bracket structure between a first relative position and a second relative position,
  wherein, when the guide pin is located in the first relative position, the resilient bushing is positioned in contact with the caliper structure,
  wherein, when the guide pin is located in the second relative position, the resilient bushing is spaced apart from the caliper structure, and
  wherein the resilient bushing biases the guide pin toward the first relative position.

15. The brake mechanism of claim 14, wherein the resilient bushing slides on the guide pin during movement of the guide pin between the first relative position and the second relative position.

16. The brake mechanism of claim 14, wherein:
  the brake mechanism is configured to be positioned in a brake released state and a brake applied state, and
  the guide pin moves from the first relative position to the second relative position in response to the brake mechanism moving from the brake released state to the brake applied state.

17. The brake mechanism of claim 16, wherein:
  moving of the brake mechanism from the brake released state to the brake applied state causes the resilient bushing to slide on the guide pin from the first relative position to the second relative position, and
  wherein moving of the brake mechanism from the brake applied state to the brake released state causes the resilient bushing to slide on the guide pin from the second relative position to the first relative position.

18. The brake mechanism of claim 14, wherein:
  the resilient bushing includes (i) a cylindrical shell that defines a central passage, and (ii) a plurality of resilient members extending radially from the cylindrical shell,
  the guide pin is received within the central passage, and
  the plurality of cylindrical members are positioned in contact with the interior bore surface.

19. The brake mechanism of claim 18, wherein the guide pin slides on the cylindrical shell when the guide pin moves between the first relative position and the second relative position.

20. The brake mechanism of claim 14, further comprising (i) a second anchor bracket structure, (ii) a second caliper structure, (iii) a second guide pin fixed to the second caliper structure, (iv) a second bore structure having a second interior bore surface that defines a second guide pin bore, the second bore structure being fixed in relation to the second anchor bracket structure, and the second guide pin bore being configured to receive the second guide pin therein, and a second resilient bushing interposed between the second guide pin and the second interior bore surface,
  wherein the second guide pin is movable in relation to the second anchor bracket structure between a third relative position and a fourth relative position,
  wherein, when the second guide pin is located in the third relative position, the second resilient bushing is positioned in contact with the second caliper structure,
  wherein, when the second guide pin is located in the fourth relative position, the second resilient bushing is spaced apart from the second caliper structure, and
  wherein the second resilient bushing biases the second guide pin toward the third relative position.

* * * * *